April 23, 1946.  A. HANSON  2,399,116
GLASS FURNACE
Filed April 18, 1942  3 Sheets-Sheet 2

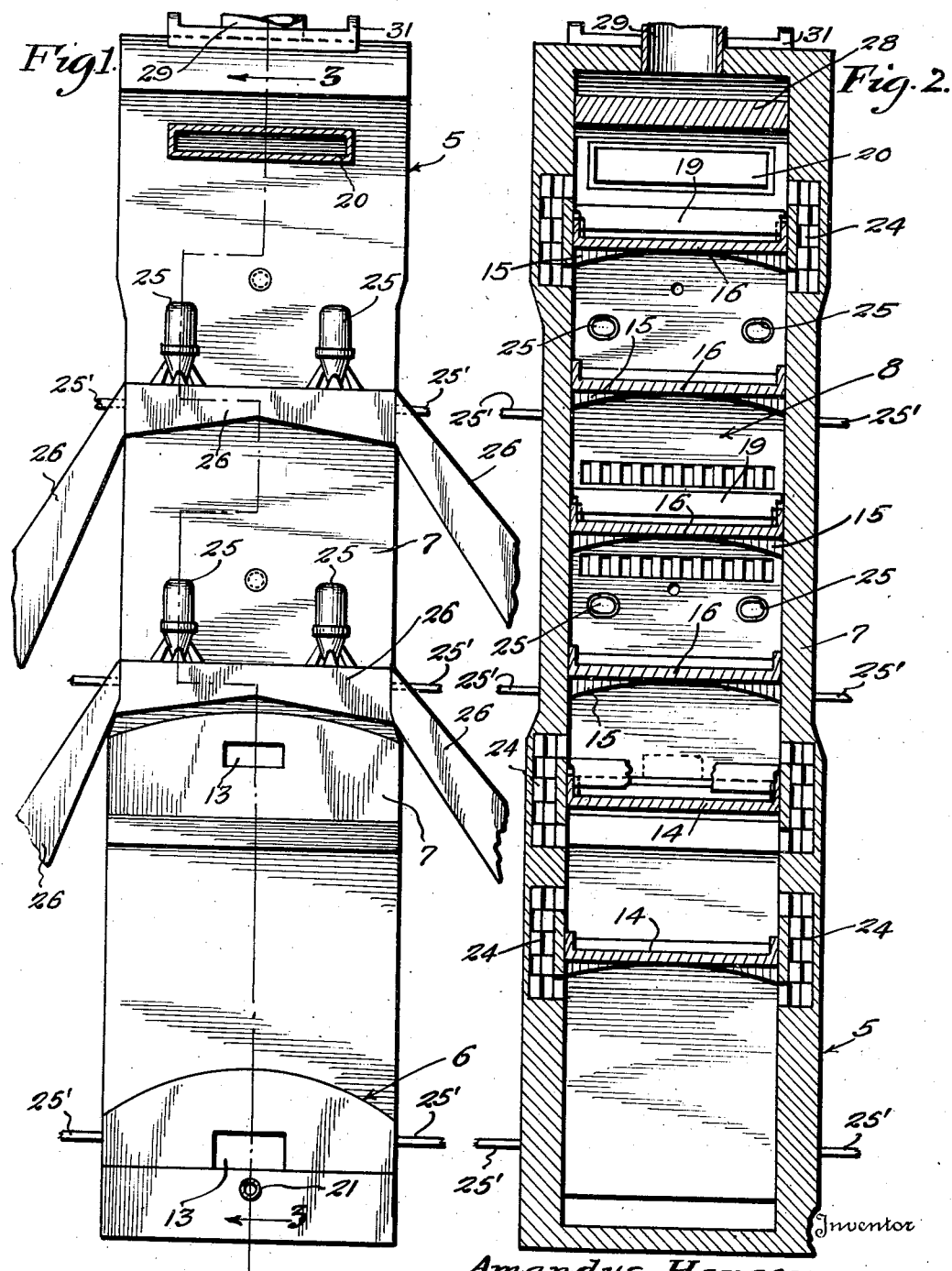

Inventor
Amandus Hanson
By Clarence R. Gorman
Attorney

April 23, 1946.  A. HANSON  2,399,116
GLASS FURNACE
Filed April 18, 1942  3 Sheets-Sheet 3
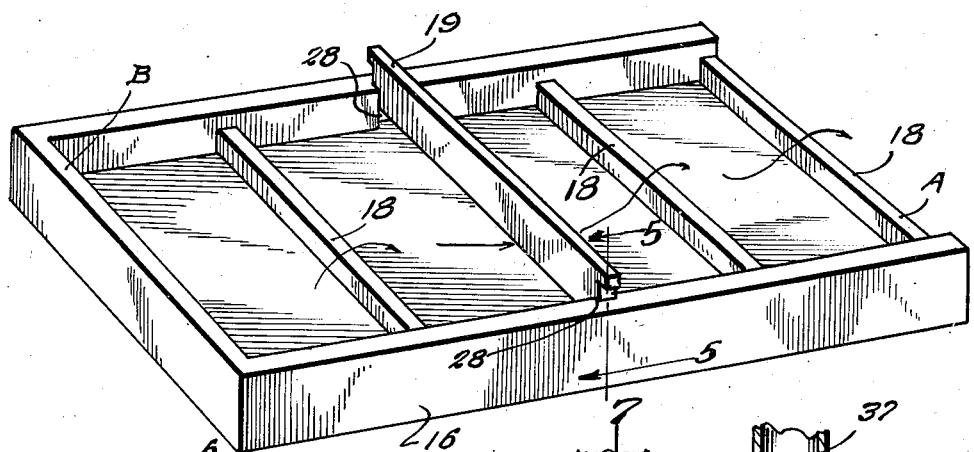
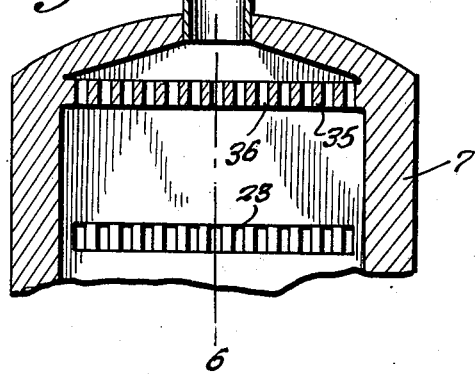
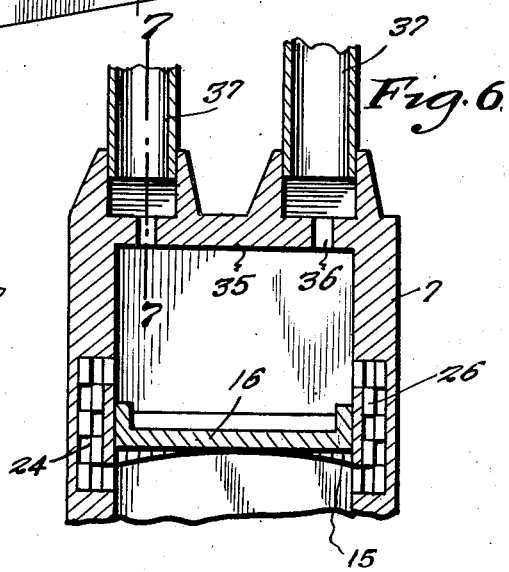
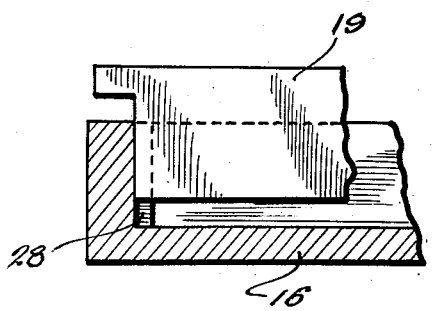
Inventor
Amandus Hanson
By Clarence R. Gorman
Attorney

UNITED STATES PATENT OFFICE 2,399,116

GLASS FURNACE

Amandus Hanson, Coffeyville, Kans.

Application April 18, 1942, Serial No. 439,613

9 Claims. (Cl. 263—30)

This invention relates to furnaces for making glass of any type, and which also may be employed for smeltering ingredients for making materials other than glass.

The primary object of this invention is the provision of a device of the above-stated character which will materially shorten the time necessary for making of glass or other similar materials and at a lower cost.

Another object of this invention is the provision of a construction, wherein the ingredients may be efficiently, quickly and economically processed so that the finished material will be free of defects and of the highest quality.

A further object of this invention is the provision of a device, wherein the incoming ingredients may be rapidly fluxed and flowed by gravity receiving at the same time a thorough mixing action and subjected to a desired or proper temperature, so that high grade glass at a low cost may be produced.

A still further object of this invention is the provision of means for permitting drawing of glass of different strengths.

With these and other objects in view, as will become more apparent as the description proceeds, the invention consists in certain novel features of construction, combination and arrangement of parts, as will be hereinafter more fully described and claimed.

For a complete understanding of my invention, reference is to be had to the following description and accompanying drawings, in which:

Figure 1 is a side elevation illustrating a furnace constructed in accordance with my invention;

Figure 2 is a sectional view taken on the line 2—2 of Figure 3;

Figure 4 is a perspective view illustrating one of the trays;

Figure 5 is a detail sectional view taken on the line 5—5 of Figure 4;

Figure 6 is a sectional view taken on the line 6—6 of Figure 7;

Figure 7 is a sectional view taken on the line 7—7 of Figure 6.

Figure 3:
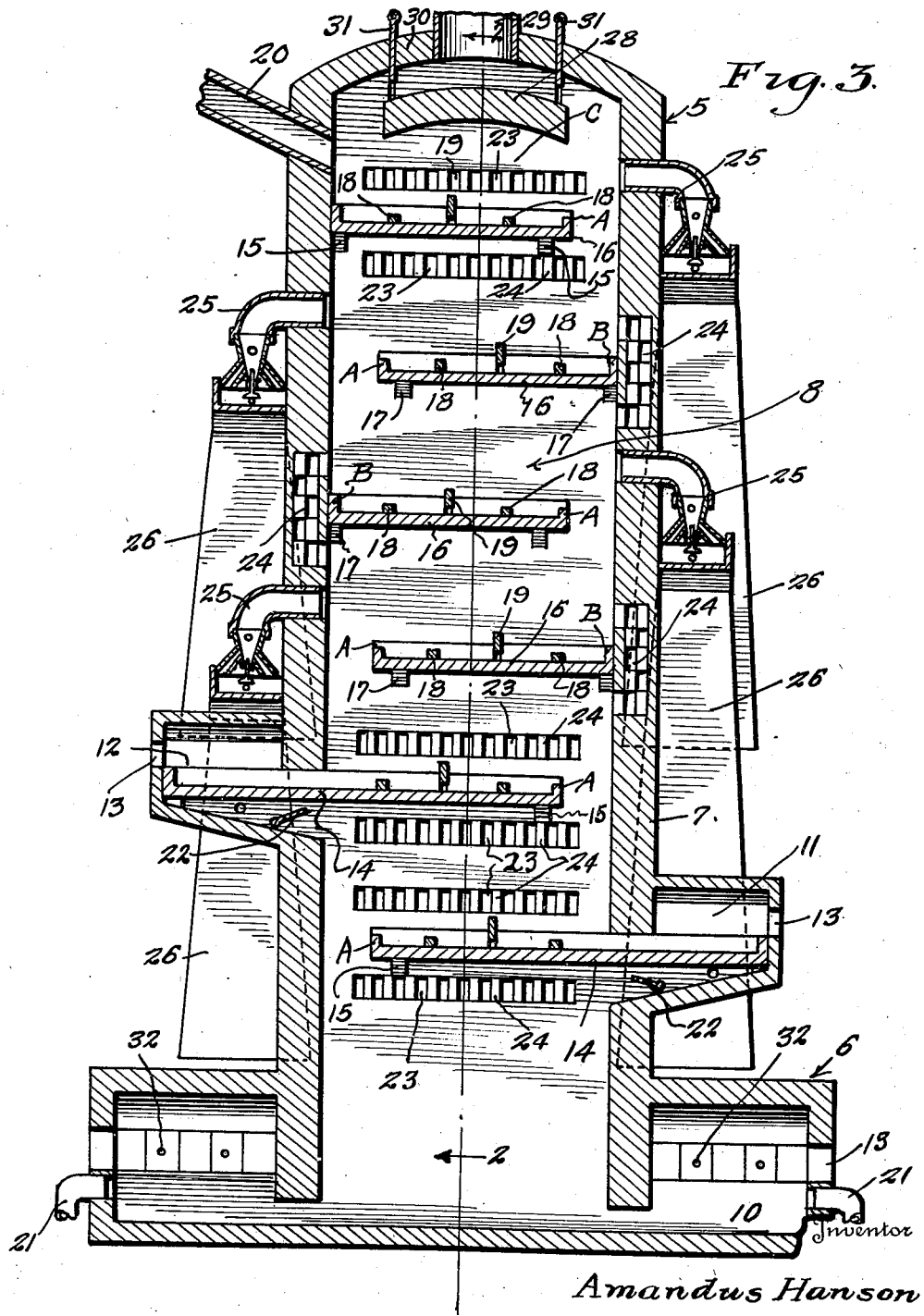
Figure 3 is a sectional view taken on the line 3—3 of Figure 1.

Referring in detail to the drawings, the numeral 5 indicates as an entirety a furnace especially adapted for melting ingredients which go to make up glass or other materials, and primarily consists of a base structure 6 and a tower structure 7 rising vertically therefrom and in which is formed a vertically disposed flue or chamber 8 through which materials to be melted and treated gravitate in a zig-zag course.

The base structure 6 is of hollow formation forming a drawing chamber 10 lowermost situated in respect to drawing chambers 11 and 12 formed in the tower structure 7. The drawing chambers 10, 11 and 12 are so constructed that conventional drawing machines can obtain molten materials therefrom for the purpose of drawing glass or similar material, parts 13 being provided to admit entrance of the drawing machines. In forming the drawing chambers 10 and 12, opposite walls of the tower structure are offset horizontally as clearly shown in Figure 3. Trays 14 are located in the drawing chambers supported horizontally by arches 15. It will be seen that the trays 14 extend well into the flue 8 and are oppositely disposed with respect to each other.

Arranged above the drawing chambers within the flue 8 are a series of trays 16 arranged in staggered relation to each other and supported by arches 17. The trays are disposed substantially horizontally and each has a discharge end A and a receiving end B and further include upstanding side and rear walls as well as a bottom wall. Traversing the bottom wall are spaced ribs 18 and mounted on the side wall and adjustable relative to the bottom wall is a floater 19. The floater 19 is spaced with the bottom wall of the tray so that material may flow thereunder, while the ribs 18 cause the flowing material to flow thereover. The ribs adjacent the discharge end A of the tray will permit flowing material to spread and flow in sheet form downwardly onto the tray thereunder. Thus, it will be seen that materials passing over the trays are caused to rise and fall, or in other words, to travel in an over-and-under motion which brings about rapid and thorough mixing of the ingredients or materials.

The upper portion of the flue 8 above the uppermost tray 16 forms a fluxing chamber C in which ingredients may be received from a discharge conduit 20 leading therein through one of the vertical walls of the tower structure. It is proposed that the ingredients be fed into the conduit through a suitable automatic feeding mechanism, not shown, so that a continuous and even flow of materials may be delivered into the fluxing chamber C onto the uppermost tray 16.

Heat from a source not shown is introduced into the lowermost drawing chamber 10 by conduits 21 located in the end wall of a conduit. This heat may pass along the drawing chamber in contact with material therein and rise upwardly in the flue 8. Also, if desired, suitable burners may introduce heat into the drawing chamber 10, the burners, while not shown being preferably located in vertical side walls of the chamber 10 above the level of the material therein. Heat also is introduced into the drawing chambers 11 and 12 below the trays thereof and flows horizontally under the trays and may be controlled by dampers 22.

Arranged in walls of the tower structure are heat by-pass conduits 23 which communicate with the flue 8 above and below the various trays located within the tower structure. By reference to Figure 3, it will be seen that the heat by-passes so that it will be discharged transversely of the trays 14 in the drawing chambers 11 and 12 and lengthwise of the trays located in the flue above the tray 16, except for the uppermost tray wherein the by-pass flue therefor is so arranged as to cause the flow of heat to be transversely of the tray. It is preferable that each by-pass conduit be divided into a series of passages through the provision of series of spaced blocks 24. In arranging the blocks 24 one series is grouped vertically while the adjacent series will be arranged crosswise thereto. The purpose of the blocks is to check the flow of the heat through the by-pass passages and also to absorb and retain heat.

Heat is also introduced into the flue 8 through walls of the tower structure above the trays through the employment of burners 25 furnished with air through conduits 26 built onto the exterior of the tower structure and each of substantially inverted U-shape, the receiving ends of the conduits being controlled by dampers, not shown. The burners 25 form the subject matter of a copending application filed April 18, 1942, Serial No. 439,612, and the detail of construction thereof will not be herein set forth. However, it will be seen that the heat from the burners is introduced directly crosswise of the flue 8 and from opposite sides thereof between the trays. The heating being discharged by the burners 25 in the manner specified will subject the flow of material from one tray to another to heat of a desired temperature to bring about efficient melting and comingling of the various ingredients.

An arch-shape baffle 28 is arranged in the fluxing chamber C below an exhaust stack 29 extending from the dome-shaped top wall 30 of the tower structure. Carried by the dome-shaped wall 30 and coactive with the baffle 28 are dampers 31 adjustable to regulate the flow of exhaust from the chamber 8 to the stack 29.

The base structure 6 as well as the tower structure may be provided with peek openings 32 whereby persons exteriorly of the device may easily view what is transpiring in the device.

It will be seen from the foregoing description taken in connection with Figure 3, that the fluxing chamber C being located uppermost within the flue 8 receives the greatest amount of heat owing to the way the heat is introduced into the device, as before described. This is extremely desirable for the purpose of bringing about rapid and thorough fluxing of the material as it enters the fluxing chamber C from the conduit 20 onto the uppermost tray. The ingredients or materials being fluxed flow over the uppermost tray towards the discharge end with an up-and-over and over-and-under motion due to the arrangement of the ribs and floaters, and flows from the uppermost tray at the discharge end A thereof in sheet form down to the next tray, and then endwise of said next tray and therefrom onto the tray thereunder. This flow of material in molten form continues throughout its passage downwardly through the flue 8, and is received first into the tray of the drawing chamber 12 where a certain amount thereof may be drawn out for the making of glass or similar material of one strength. The surplus material flows from the tray of the chamber 12 onto the tray of the chamber 11 where the material may be drawn off to form glass or similar material of a greater strength, and the surplus material of the tray in the chamber 11 may gravitate therefrom into the drawing chamber 10 of the base structure, where a stronger grade of glass or similar material may be drawn therefrom.

From the foregoing description it will be seen that the molten material from the fluxing chamber takes a downwardly zig-zag course in the flue 8 flowing from one tray to to the tray thereunder in a thin sheet form, and at that time being subjected to heat introduced into the flue 8 by the burners 25. When the molten material arrives within the chambers 12, 11 and 10, it is kept at a desired temperature through the heating provided for said chambers.

Instead of employing a single stack for the flue 8, the latter may be constructed with a top wall 35 in which ports 36 are provided. The ports 36 lead to stacks 37. This arrangement provides a desirable restriction of the flow of heat from the flue. Also it will be seen that due to the construction of the flue within the tower structure and the stack or stacks that the heat will have a natural draft and consequently will rise freely upwardly in the flue 8 and with relation to the various trays, as specified, to bring about the efficient and thorough heating of the fluxed material as it travels from one tray to another by gravitation. Also, it is clearly apparent that the materials flowing over the trays will become thoroughly comingled or mixed with each other and also will be further mixed due to their fall from one tray to another in sheet form.

Each tray has side walls thereof grooved, as shown at 28, to receive the floaters 19 which will prevent lateral displacement of the floaters.

It is to be understood that the tower structure as well as the base structure may be constructed of brick or any other material suitable for the purpose and efficiently and thoroughly reinforced and if desired may be exteriorly insulated.

A furnace of the construction described and shown in the drawings will operate with less fuel because all heat in the furnace is used several times by means provided for the circulation of the heat about the various trays. Also, the furnace will operate with less capacity and yet make the same quality of glass or similar material as obtained from conventional types of furnaces, and it will be noted that no large quantity of ingredients or materials is required to be in the furnace at any one time. The over-and-under motion produced to the molten material as it travels across the various trays brings about more efficient mixing or comingling of the ingredients, so that glass or similar material formed from said molten ingredients will be free from distortion, waves or the like. Also, a furnace of this construction will require less space than a conventional type of furnace owing to the fact that the flow of materials or ingredients therethrough is in a vertical path. While all the advantages are not herein stated that will be derived through the use of this furnace in the manufacture of glass or similar material, it is believed that the advantages mentioned will clearly illustrate some of the most important results obtained through the use of said furnace.

The burners 25 are fed gaseous fuel by supply pipes 25'.

While I have shown and described the preferred embodiment of my invention, it will be understood that minor changes in construction, combination and arrangement of parts may be made without departing from the spirit and scope of the invention as claimed.

What is claimed is:

1. In a furnace for fluxing materials, a vertical structure having a flue therein for the passage of material by gravitation and provided with drawing and fluxing chambers with the fluxing chamber disposed uppermost to receive material from a supply, means supplying heat to said flue, and substantially horizontal trays in said structure alternately arranged with their opposite end walls against the side walls of said vertical structure to provide a single zig-zag passage for the heat current upwardly through said flue, said trays spaced remotely in a vertical sense to cause a long free falling sheet of the molten material from one tray to another through which the heat current is required to pass.

2. In a furnace for fluxing of materials, a tower construction providing a vertical flue having therein drawing and fluxing chambers with the fluxing chamber disposed uppermost within the flue, exhaust means connected to the upper end of the flue, means for delivering materials into the fluxing chamber, a series of horizontally arranged trays in the flue, some of said trays arranged in the chambers and the other trays arranged therebetween over which fluxed materials flow with gravitation from the fluxing chamber to the drawing chamber, said trays each including means to bring about over-and-under motion to the flow of fluxed material thereover, said trays being staggered with alternate trays abutting one side wall of the flue and intermediate trays abutting the opposite side wall, said trays spaced great vertical distances from one another to cause long free flowing sheets of the fluxed material dropping from one tray to the next lower tray, and means for introducing heat into the lower end of the flue.

3. In a furnace for fluxing of materials, a tower construction providing a vertical flue having therein drawing and fluxing chambers with the fluxing chamber disposed uppermost within the flue, exhaust means connected to the upper end of the flue, means for delivering materials into the fluxing chamber, a series of horizontally arranged trays in the flue, some of said trays arranged in the chambers and the other trays arranged therebetween over which fluxed materials flow with gravitation from the fluxing chamber to the drawing chamber, said trays each including means to bring about over-and-under motion to the flow of fluxed material thereover, means for introducing heat into the lower end of the flue for travel upwardly therein to the exhaust means, said trays staggered with alternate ends of successive trays abutting the side walls of the flue, said trays being shallow and spaced great vertical distances to cause long free falling sheets of the fluxed material from one tray to the next lower tray, and means for introducing heat into the flue horizontally thereof over some of said trays.

4. In a furnace for fluxing of materials, a tower construction providing a vertical flue having therein drawing and fluxing chambers with the fluxing chamber disposed uppermost within the flue, exhaust means connected to the upper end of the flue, means for delivering materials into the fluxing chamber, a series of horizontally arranged trays in the flue, some of said trays arranged in the chambers and the other trays arranged therebetween over which fluxed materials flow with gravitation from the fluxing chamber to the drawing chamber, said trays each including means to bring about over-and-under motion to the flow of fluxed material thereover, means for introducing heat into the lower end of the flue for travel upwardly therein to the exhaust means, means for introducing heat into the flue horizontally thereof over some of said trays, said wall structure having by-pass heat passages for conveying heat traveling upwardly in the flue above the trays.

5. In a furnace for fluxing of materials, a tower construction providing a vertical flue having therein drawing and fluxing chambers with the fluxing chamber disposed uppermost within the flue, exhaust means connected to the upper end of the flue, means for delivering materials into the fluxing chamber, a series of horizontally arranged trays in the flue, some of said trays arranged in the chambers and the other trays arranged therebetween over which fluxed materials flow with gravitation from the fluxing chamber to the drawing chamber, said trays each including means to bring about over-and-under motion to the flow of fluxed material thereover, means for introducing heat into the lower end of the flue for travel upwardly therein to the exhaust means, means for introducing heat into the flue horizontally thereof over some of the trays, said wall structure having by-pass heat passages for conveying heat traveling upwardly in the flue above the trays, and baffle means located in said passages.

6. In a furnace for fluxing of materials, a tower construction providing a vertical flue having therein drawing and fluxing chambers with the fluxing chamber disposed uppermost within the flue, exhaust means connected to the upper end of the flue, means for delivering materials into the fluxing chamber, a series of horizontally arranged trays in the flue, some of said trays arranged in the chambers and the other trays arranged therebetween over which fluxed materials flow with gravitation from the fluxing chamber to the drawing chamber, said trays each including means to bring about over-and-under motion to the flow of fluxed material thereover, means for introducing heat into the lower end of the flue for travel upwardly therein to the exhaust means, means for introducing heat into the flue horizontally thereof over some of the trays, said wall structure having by-pass heat passages for conveying heat traveling upwardly in the flue above the trays, baffle means located in said passages, and baffle means arranged adjacent the exhaust means within the fluxing chamber.

7. In a furnace for fluxing of materials, a tower construction providing a vertical flue having therein drawing and fluxing chambers with the fluxing chamber disposed uppermost within the flue, exhaust means connected to the upper-end of the flue, means for delivering materials into the fluxing chamber, a series of horizontally arranged trays in the flue, some of said trays arranged in the chambers and the other trays arranged therebetween over which fluxed materials flow with gravitation from the fluxing chamber to the drawing chamber, said trays each including means to bring about over-and-under motion to the flow of fluxed material thereover, means for introducing heat into the lower end of the flue for travel upwardly therein to the exhaust means, means for introducing heat into the flue horizontally thereof over some of the trays, said wall structure having by-pass heat passages for conveying heat traveling upwardly in the flue above the trays, baffle means located in said passages, baffle means arranged adjacent the exhaust means within the fluxing chamber, and adjustable dampers coactive with the latter-named baffle means.

8. In a furnace for fluxing of materials, a base construction providing a drawing chamber, a vertical tower having a flue connecting with said drawing chamber, means to deliver heat to said chamber to pass therefrom upwardly in the flue, exhaust means connected to the upper end of the flue, said flue having a fluxing chamber in the upper end thereof and connecting with said exhaust means, superimposed drawing chambers above the first-named drawing chamber within the flue and adapted to feed material from one to another and to the first-named drawing chamber, said second-named drawing chambers having horizontally arranged trays over which material passes from one tray to another, a tray in the fluxing chamber and arranged horizontally therein, staggeredly arranged trays arranged horizontally in the flue between the uppermost drawing chamber and the tray of the fluxing chamber over which flowing material passes on gravitation from the fluxing chamber to the lowermost drawing chamber, heating devices delivering heat into the flue between the trays located in the flue between the fluxing chamber and the uppermost drawing chamber, means for admitting heat to the drawing chambers within the flue, said tower structure having by-pass conduits for by-passing heat of the fluid about the trays in the flue above the uppermost drawing chamber.

9. In a furnace for fluxing of materials, a walled construction providing a vertical flue having therein drawing and fluxing chambers with the fluxing chamber disposed uppermost, exhaust means connected to the fluxing chamber, means delivering heat into the flue to rise therein to said exhaust means, staggeredly arranged superimposed horizontal trays supported in said chambers and flue between the chambers and adapted to feed fluxed material in flow form by gravitation from one tray to another, said trays each including ribs over which the flowing material must pass and floaters under which said material must pass, and means for delivering heat into the flue horizontally thereof between the trays located above the drawing chamber.

AMANDUS HANSON.